Patented Dec. 12, 1944

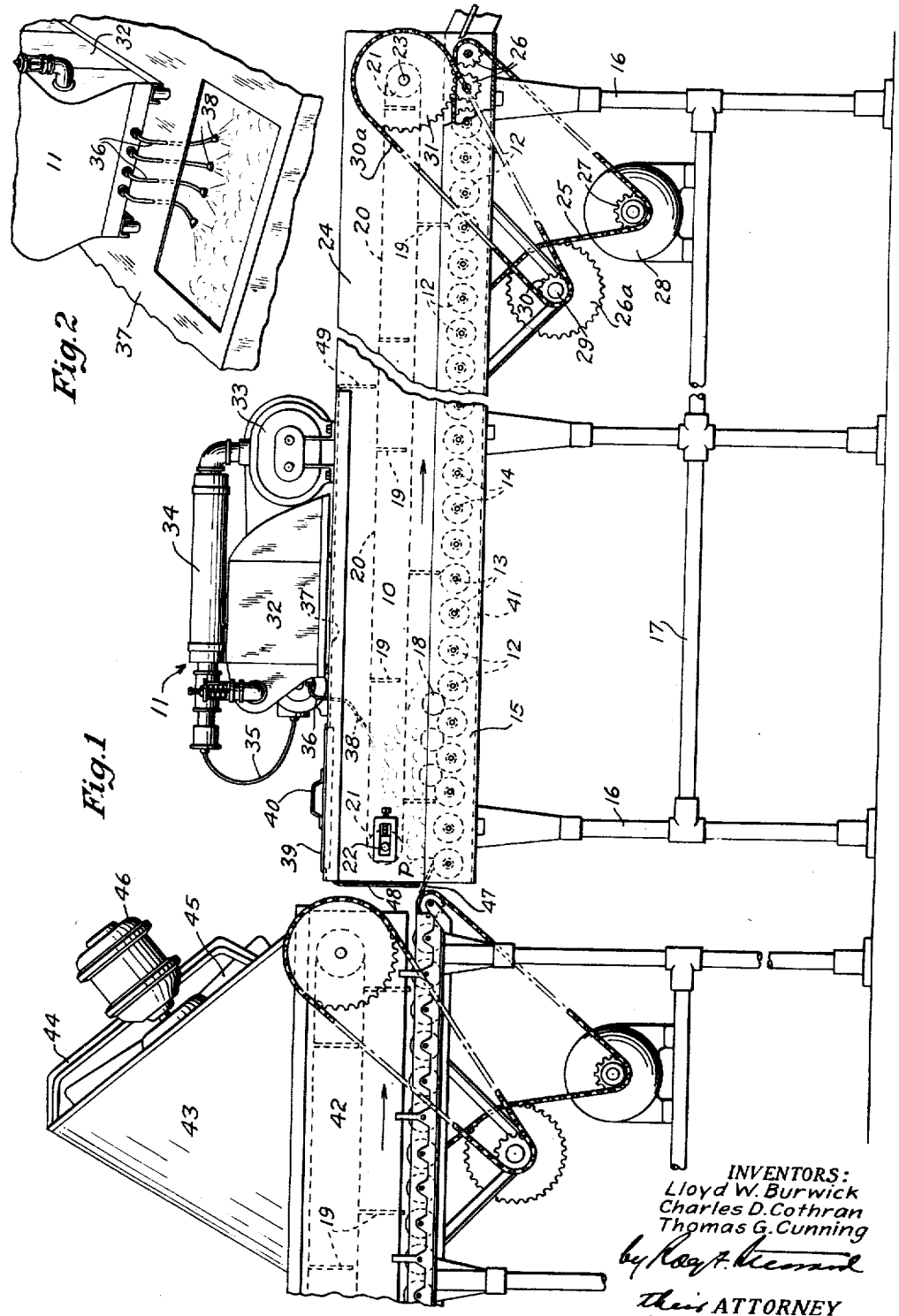

2,364,946

UNITED STATES PATENT OFFICE 2,364,946

PREPARATION OF FRESH FRUIT FOR MARKET

Lloyd W. Burwick, McAllen, Tex., and Charles D. Cothran, Pomona, and Thomas George Cunning, Upland, Calif., assignors to Brogdex Company, Pomona, Calif., a corporation of California Application October 12, 1943, Serial No. 505,946

15 Claims. (Cl. 99—168)

This invention relates to preparation of fresh fruit for market; and it relates more particularly to a novel process of providing fresh citrus or other fruit with a thin coating of waxy or like material in order to enhance the marketability of the fruit, said waxy material being applied to the fruit in extremely finely divided solid condition. Certain types of fresh produce, such as tomatoes, that are commonly termed vegetables, may also be processed to advantage in accordance with the invention, and are to be understood as included within the expression "fresh fruit," which is employed herein in a generic sense except when otherwise indicated.

In the commercial preparation of fresh fruit for market, especially citrus fruit such as oranges, grapefruit, lemons and tangerines, thinly coating the fruit with waxy material in order to reduce the natural rate of shrinkage or withering of the fruit during shipment to market and thereafter until it has reached the ultimate consumer, as well as to impart to it a desirable surface gloss or shine whereby to enhance further its attractiveness and salability, has been common practice in the industry for about twenty years past. It is a generally recognized fact that this practice has attained its highest degree of perfection in the process disclosed in the Brogden and Trowbridge Patent No. 1,940,530, which involves causing a jet of atomized hot molten waxy material of relatively high melting point to impinge in liquid condition upon the fruit, and smoothing the applied fluid waxy material out very thinly and uniformly over the fruit surface by the action of rapidly rotating polisher brushes contained in a chamber through which the fruit travels and which is heated to maintain the temperature therein above, or at any rate not substantially below, the melting point of said waxy material. The waxy material consists, typically, of a mixture of paraffin wax and carnauba wax, the paraffin usually constituting 90% to 95% thereof. Through the use of such a waxy composition in the manner described in the patent, there can be produced on the fruit a film-like waxy coating which not only provides dependable shrinkage control in optimum degree, whereby the fruit is maintained plump and firm throughout even relatively prolonged shipping and distributing periods, but also gives the fruit a pleasing permanent lustre or gloss of the character desired in the trade. An earlier patent, Brogden No. 1,641,112, discloses a generally similar procedure utilizing paraffin alone. However, paraffin wax is soft and has a relatively low melting point; and while it is essential to optimum shrinkage control that the waxy film coating contain a relatively soft waxy component such as paraffin, a coating consisting only of paraffin or the like, regardless of how it is produced on the fruit, does not possess the permanent gloss or shine which the trade has long insisted certain fruits must display in market. Because the process of Patent No. 1,940,530 enables attaining both these important objectives admirably, it has been widely used in the citrus fruit packing industry, especially, for well over a decade. Scores of millions of boxes of oranges, grapefruit, tangerines and lemons have been protectively wax-coated in accordance with that method, and a considerable proportion of the total citrus crop of the United States is currently processed in that manner. In the industry, it has become a recognized standard to which other proposed methods are compared. No method has yet been devised which closely approaches it in excellence of results achieved.

Heating the chamber in which the fruit is subjected to the action of the polisher brushes is, however, an item of substantial expense in practicing the patented process aforesaid, not to mention the necessity for reasonably skilled supervision of the operations involved. Under the highly competitive conditions characterizing the fruit packing industry, these are considerations which it is frequently necessary for packers to take seriously into account. Moreover, due to such factors as differences in variety, condition and appearance of citrus fruit (e. g.) produced at different seasons of the year or in different growing localities, differences in distance to market, and other non-uniform trade conditions, some packers and shippers have less need than others for a waxing method of maximum excellence. Consequently, during approximately the last decade especially, there has been persistent effort and research in the hope of finding some method of waxing fruit which would be cheaper than the aforesaid process of Patent No. 1,940,530 and yet would satisfactorily meet the less exacting requirements of such packers and shippers. The resultant proposals, of which there have been many, and some of which have gone into use to greater or less extent, have practically all aimed at eliminating or much reducing the employment of heat, and sometimes brushing also, in spreading over the surface of the fruit whatever waxy coating material is to be applied.

With respect to elimination or reduction of heating, it is suggested, even in Patent No. 1,641,112, that heating of the brushing chamber, although much the best practice, can be dispensed with within the broad scope of the invention. However, extensive practical experience long ago demonstrated that serious difficulties were involved in attempting thus to practice the process disclosed, whether the waxy material employed was paraffin alone or the harder and higher-melting paraffin-carnauba mixtures of Patent No. 1,940,530. It was found that, aside from the fact that the hot fluid wax discharged or jetted against the fruit congealed on the fruit in blotchy masses which it was impossible or extremely difficult to brush out with the requisite thinness and uniformity by polisher brushes in an unheated or insufficiently heated environment, much of said fluid wax also reached and congealed on said brushes, encasing the bristles and bristle tufts thereof in solidified wax and rendering the brushes incapable of performing their intended function.

Among the waxing methods proposed in the effort to avoid using heat are those employing aqueous emulsions of waxy material. A proposal of another type involves dissolving waxy material in a volatile non-aqueous solvent, and spraying the solution upon fruit at ordinary atmospheric temperature, the solvent being then allowed to evaporate. Although both these types of procedures have found some commercial application, it is well known that they do not give good shrinkage control and are sometimes seriously objectionable on other grounds.

It has also been proposed heretofore to provide fresh fruit with a waxy coating that would afford appreciable shrinkage control and also give a lustrous surface, while avoiding the use of heat, by showering down upon fruit, as it travels over polisher brushes, solid waxy material which has been ground or crushed to a powder of such fineness (on the order of 200 to 100 mesh) that a sufficient quantity thereof, even though it is solid, will adhere to the skin of the fruit upon striking it and will then be spread out thereover, by the rubbing action of the polisher brushes, to form the desired protective and glossy film coating. This method, which is disclosed in the patent to Brogden No. 1,985,238, appeared so promising initially that it went into commercial use on a substantial scale. However, the results attained have not been altogether satisfactory, the degree of shrinkage control, especially, having been neither so high nor so dependable as is desirable. This method has therefore fallen short of meeting the aforesaid need for a relatively cheap alternative waxing process.

The eventual belief of those skilled in the art that satisfactory solution of the problem did not lie in applying finely comminuted solid waxy material directly to the skin or rind of the fruit to be coated and brushing the fruit in the cold, particularly where said material is sufficiently hard and high-melting to take a good polish or shine, is reflected in the patents to Brogden No. 1,985,239 and Skinner 1,985,842. According to the processes of these patents, fruit is first provided with a base coating of a relatively low-melting waxy material, such as paraffin, applied in fluid condition and allowed to harden or set sufficiently to maintain its integrity but preferably, without becoming completely non-tacky; whereupon a second layer of harder and higher-melting waxy material is superimposed upon and anchored to the softer primary or basic layer by showering upon the latter a suitable quantity of said higher-melting material in powdered solid form while rubbing on polisher brushes in an unheated environment. The higher-melting material is pulverized by crushing or grinding, in the procedure of Patent No. 1,985,239; while in that of Patent No. 1,985,842, the pulverizing is accomplished by atomizing the molten material into an unheated atmosphere, a method recommended as easier and more economical to employ. Where it is desired to apply the relatively soft primary layer without use of heat in conjunction with brushing, both patents suggest employing the lower-melting material for that primary layer in the form of a solution or an emulsion. The methods of both these patents have the disadvantage, however, that they involve two distinctly different successive wax-coating treatments, thus complicating the operation as a whole and increasing costs both for skilled supervision and additional equipment.

The present invention is based upon the discovery that if molten waxy material be atomized or nebulized in extremely small particles into an atmosphere which is at a sufficiently low temperature to congeal said particles quickly to solid condition, and if care be taken to bring only such solid particles, and no uncongealed particles, directly into contact with the surface of fresh fruit in sufficient quantity and then properly rub them thereover by means of rotating polisher brushes, for example, surprisingly effective results are attainable in providing said fruit with a waxy coating that has pronounced shrinkage control and is also lustrous or glossy. These applicants have found that if powdered waxy material is produced in this manner and applied directly to the rind or skin of fruit that has not been previously coated, it behaves so differently from the same waxy material powdered by grinding or crushing and applied directly to the fruit rind as to enable getting much more satisfactory and dependable wax coatings on fruit than are attainable by following the procedure of Patent No. 1,985,238. Said coatings are also markedly superior to those obtained by so-called "cold wax" procedures of the type disclosed in the patent to Haworth 1,703,144, for example, wherein a slab of solid paraffin or other waxy material is pressed against the lower surfaces of rotating polisher brush rolls, which are intended to remove wax from said slab and transfer it to the surface of fruit traveling on the upper surfaces of said rolls.

This greatly improved result achieved by the process of the present invention was unexpected and the reason for it is still not clear. However, since hitting upon said process, applicants have determined by microscopic examination that the powdered material obtained by congealing properly nebulized molten waxy material suitable for the purpose, has a particle size so small that it is of quite a different order of magnitude from the bulk of powdered waxy material used in the only previously suggested process in which powdered waxy material is applied directly to the fruit rind itself without previously applying to said rind, by some other procedure, a primary anchoring layer or nexus. In a typical instance, the largest particles in a powder produced by congealing nebulized melted paraffin wax were found to be about 0.0025 inch in diameter and the smallest 0.0003 inch in diameter; approximately 60% having a diameter of not more than about 0.001 inch. Much the greater part of it will therefore pass a No. 325 (U. S. standard) sieve, and all of it will pass a No. 200 sieve. Moreover, when viewed under a microscope, the wax particles were found to be, in general, remarkably uniform in size and to have the appearance of being hollow spheres. Upon applying light pressure to them with a wiping movement, the resultant smudge or smear, viewed under the microscope, was found to consist of tiny streaks of wax about 0.00025 inch wide and almost touching each other. At the edge of the smudge were numerous small particles of wax which looked like fragments of broken spheres and were of such extreme thinness as seemingly to support the view that the wax particles, as congealed, are hollow spheres. Whether this be actually the case or not, it is apparently the particular physical form of the congealed particles, in addition to their minute size, which accounts in large measure for the hitherto unsuspected specific adaptability of waxy powder produced in this manner to adhere directly to the skin of fruit not previously coated, and to be readily spread thereover by brush rolls to form a waxy film coating of superior character, all at ordinary atmospheric temperatures; which specific adaptability is for the first time made use of by the present invention.

In carrying out the novel process, fluid molten waxy material is atomized or nebulized, with the aid of heated compressed air or other suitable gaseous medium, into an atmosphere at such sufficiently lower temperature and under such other conditions that, when the nebulized wax particles have cooled substantially to that temperature, they have congealed and are suspended in solid condition in said atmosphere; and such aeriform suspension of solid wax particles, free of uncongealed particles, is contacted directly with the surface of fresh fruit, and the fruit is rubbed by means of polisher rolls or the like, most desirably simultaneously with such contacting, to spread the adhering wax particles over the fruit and provide it with a thin waxy coating. Ordinarily the fruit will have undergone the customary cleansing with an aqueous washing medium, followed by surface drying in one or another of the well known types of driers available for the purpose. Most desirably, the cleansed and dried fruit is then conveyed into and through a chamber wherein it is subjected to the action of rotary horsehair polisher brushes while bathed in an air suspension of solid wax particles of the character aforesaid which may be, and most advantageously is, produced by atomizing or nebulizing suitable molten waxy coating material directly into said chamber; but it is essential that this be done under such conditions that none of the resultant wax particles can reach either the fruit or the polisher brushes before it has congealed to solid form. Otherwise stated, the temperature within the waxing chamber must be substantially below the solidifying point of the waxy material; and all the particles of atomized waxy material must be compelled in one way or another to follow a path of travel, in passing from the discharge outlet of the atomizer to the fruit and the polisher brushes, long enough to ensure that the particles will have sufficient time, at that waxing chamber temperature, to completely solidify. Strict observance of this operating condition is essential in practicing the process of the invention.

Without intending thereby to restrict the scope of the invention, one particularly desirable practical embodiment thereof will now be described in detail by way of a specific illustrative example from which a fuller understanding of the underlying principles of the invention may be gained.

Although apparatus of various different specific types may be employed in practicing the invention, reference will be made, in connection with the following description, to the accompanying drawing which illustrates one type and arrangement of apparatus found suitable in practice. In said drawing, Fig. 1 is a side elevation, partly broken away and in section.

Fig. 2 is a perspective view of part of the apparatus illustrated in Fig. 1.

Referring to the drawing, 10 indicates generally a fruit brusher or polisher of well known type, above which is mounted a molten wax atomizer or nebulizer, indicated generally at 11. The type of polisher here illustrated comprises a substantially horizontal series of parallel transversely extending rotary cylindrical brush rolls 12 whose brushing peripheries are so closely adjacent as to prevent fruit from falling through between them. Said brushes have bristles of horsehair or the like, and are carried on shafts 13 which are journaled at their opposite ends in bearings 14 on side rails 15 of the apparatus frame; which frame also comprises upright members 16 and lower horizontal members 17. By means of suitable driving means to be presently described, all the brush rolls are rotated in the same angular direction (clockwise in Fig. 1) such that their upper surfaces tend to convey fruits 18 through the apparatus in the direction of the arrow, this advancing movement being further ensured, if desired, by overhead pusher mechanism comprising transverse pusher members 19 swingably suspended from cross rods attached at their opposite ends to a pair of endless chains 20, trained around sprockets 21 which are mounted on shafts 22, 23, these shafts being journaled at their ends in bearings (not shown) carried by the upwardly extending side walls 24 which enclose the polisher apparatus laterally.

The polisher rolls are driven in this instance by means of an endless chain 25 passing over sprockets 26 on the roll shafts 13, a guide sprocket 26a, and driving sprocket 27 on the shaft of motor 28. Guide sprocket 26a is fixed to rotatable shaft 29, which also carries fixed thereto a smaller sprocket 30. This latter sprocket is connected by chain 30a to sprocket 31 which is fixed to shaft 23, whereby to drive the overhead pusher or clean-out mechanism already referred to.

The automizer or nebulizer unit 11 may be of any known or suitable type capable of producing a fine mist or fog from molten waxy material similar, for example, to that disclosed in the patents to Skinner No. 1,830,297 and Pierce 1,940,269. Since the specific construction of this unit forms no part of the present invention, no detailed description thereof is required here. In the present instance, 32 represents the supply tank containing molten waxy material and provided with electrical heating means (not shown) by which said material may be heated to a sufficiently high temperature to maintain it in highly fluid condition. At 33 is a motor-driven blower or compressor which delivers compressed air into pipe 34 in which is located an electrical heating element (not shown) to which current is fed through lead 35, whereby the compressed air for the atomizer jets or nozzles is heated to the desired temperature. Tubes 36 lead compressed air and hot liquid waxy material from the atomizer unit through cover 37 of the polisher chamber, on which the atomized unit is mounted, to small-orifice discharge jets or nozzle tips 38, four in this instance, which discharge nebulized fluid waxy material into the unheated atmosphere above the polisher brushes. That portion of the cover 37 just forward of the tubes 36 may be provided with doors 39 removable for inspection purposes and provided with lifting handles 40. Said cover 37 is here shown as extending over only a part of the polisher, but it may extend rearwardly over the entire length of the polisher brush runway, or as much thereof as may be desired.

Below the entire series of brushes extends a pan 41 which, together with the side rails and side walls, completely enclose the polisher mechanism on its under side and laterally.

In this instance, fruit which has been previously washed and surface-dried, but not coated, is delivered to the polisher from a drier unit indicated generally at 42 (at the left in Fig. 1). This drier may be of any suitable type, but is here shown as of a well known rotary brush roll type, the construction and operation of its brush roll mechanism being virtually the same as that of the polisher unit 10. The drier unit is open or unenclosed below the brushes, however, but has a cover provided with openings from which extend upwardly and obliquely a plurality of fan housings 43, only one of which is here shown, in the forward or intake end of each of which is mounted on a spider support 44 a fan 45 driven by motor 46. These fans direct blasts of air obliquely down upon the washed fruit and the rotary brush rolls over which it advances toward the polisher unit. Upon leaving the drier to enter the polisher unit 10, the surface-dried fruit passes over delivery board 47 and through or under the flexible guard curtain or flap 48 of canvas or the like, which may be slitted if desired to facilitate such movement of the fruit and which is suspended by its upper edge, as shown, to form a yieldable closure for this end of the polisher chamber. A similar guard curtain or flap 49 depends from the opposite end of cover 37 to the level of the upper run of chain 20 of the overhead pusher mechanism. These curtains 48, 49, aid in minimizing escape from the waxing and polisher chamber of excess waxy particles suspended in the chamber atmosphere.

In a typical instance, the thus largely enclosed or housed-in waxing chamber included between the curtains or flaps 48, 49, may be on the order of 4 to 6 feet long in the direction of fruit travel, and 4 to 5 feet wide, with from 12 to 18 inches clearance between the crests of the cylindrical polisher brushes and the under side of cover 37, while the clearance between the lower side of the brushes and the pan 41 may be on the order of 4 to 6 inches. The over-all diameter of the brushes may be 4½ inches or more.

In the illustrative example here given, the waxy material employed may be a blend or mixture of a relatively soft, low-melting coating material, such as paraffin wax with a harder, higher-melting coating material that is compatible therewith and likewise non-injurious to fresh fruit, such as carnauba wax. Where a mixture of paraffin and carnauba waxes is employed, this may desirably contain from 5 to 15 per cent of carnauba by weight. In this specific instance use of a mixture consisting of 92.5 per cent paraffin wax and 7.5 per cent carnauba wax will be assumed. Such a mixture has a melting point of about 170° to 172° F. and its setting or solidifying point is in the neighborhood of 10 to 12 degrees lower. In employing this specific paraffin-carnauba blend, the molten supply in tank 32 is maintained freely fluid by keeping it heated to, say, 210°-220° F. For best results, the air for atomizing the hot liquid waxy material should be preheated sufficiently to ensure that, at its point of issuance from each atomizing nozzle, the jet of atomized or nebulized material shall be at a temperature somewhat above the solidifying point thereof, and most desirably somewhat above its melting point which in this instance, is about 172° F. Therefore, with the atomizing air preheated to from 180° to 190° F., which is good practice, there is virtually no chance of the small nozzle orifice or outlet becoming clogged with solidified or viscous waxy material; and with the atomizing air applied under adequate pressure, proper nebulization can thus be effected. While any pressure within a relatively wide range may be employed so far as broad operability is concerned, it is found that under practical operating conditions, much the best results are attainable with the atomizing air at a gauge pressure of from about 0.75 pound per square inch as a minimum, to about 2.75 pounds per square inch as a maximum; and operation in the neighborhood of the mean, 1.75 pounds, is found generally to be most satisfactory. Corresponding to the indicated typical range of air pressures, the volume of air issuing from each atomizing nozzle into the waxing chamber, in nebulizing the fluid molten waxy material, will commonly range from, say, about 3 or 4 to about 8 or 9 cubic feet per minute. The rate of introduction of waxy material into the chamber will depend in large part upon how heavy an application to the fruit is desired, the rate of feed of the hot molten material to each atomizing nozzle being under accurate control by the operator through suitable adjustment of the wax-feeding mechanism of the atomizer unit. A typical example of good practice is from 5 to 7 grams of waxy material atomized through each nozzle per minute.

The permissible maximum temperature of the waxing chamber atmosphere must, of course, be below the solidifying point of the waxy material used; most desirably it should be far below that point, at least 40 to 50 degrees F. therebelow as a general rule. The solidifying point of a wax or wax-like material is in most cases as much as six to ten or even more degrees Fahrenheit below its melting point. Thus, where the waxy material used has characteristics generally similar to those of the specific paraffin-carnauba blend whose employment is here assumed by way of example, the temperature of the chamber atmosphere should ordinarily not exceed about 110° to 115° F. as a maximum, and may usually be well below 100° F. It is vital to the practice of the novel process, as has already been pointed out, that no wax particles falling on the polisher brushes shall be in such physical condition as to stick tenaciously to the brush bristles and thereby build up on and encase the same, with resulting serious impairment or destruction of their desired rubbing function. The length of the path which, in accordances with the principles of the invention, particles of the atomized waxy material are compelled to travel as a minimum, before they can contact the fruit and brushes, in order that the particles may have become solid en route, depends primarily upon the temperature prevailing in the waxing chamber, but also to some extent upon the velocity with which the minute particles are projected into the chamber in the jets or streams issuing from the atomizing nozzles. Where the mean temperature over the path of travel is relatively high (although below the solidifying point, of course), the path of travel must be longer than where the temperature differential is greater; and, for any given temperature, the path should generally be lengthened with increase in the velocity at which the jet of nebulized material issues from the atomizing nozzle. For, any given set of operating conditions, there are various ways whereby to ensure that the said path of travel, and hence the period of time during which a wax particle is exposed to the chilling effect of the chamber atmosphere before striking a fruit or any part of the rubbing means therewithin, will be sufficiently long to effect the requisite congealing or solidifying. Usually this is best accomplished by locating the atomizer nozzle outlet at a point such that either the rectilinear distance from said outlet to the nearest fruit or portion of the rubbing means is sufficiently great, or else, by adjusting the angle of nozzle discharge, it is possible to effect a virtual increase of such rectilinear distance to the necessary extent. In any event, travel of the atomized particles from the nozzle outlets to the fruit and rubbing means through an unobstructed space avoids the complications and inefficiency which would attend the use of baffles, for example, to cause the nebulized material to follow a circuitous path in order to travel the distance requisite for congelation.

In the present specific example, using the assumed mixture of 92.5 parts paraffin and 7.5 parts carnauba wax, with the atomizing air pressure at 1.75 pounds per square inch, the atomizing nozzle tips or outlets 38 may be positioned 12 inches vertically above the polisher brushes; but since, in the absence of special provision for cooling the chamber atmosphere sufficiently, the path of travel for the atomized or nebulized waxy material would be too short under these circumstances, the nozzles are set at such an angle to the vertical as to focus the discharged jets upon a polisher brush roll crest P about 18 to 20 inches distant from each nozzle outlet. This ensures that only waxy particles which have solidified will contact the fruit and the polisher brushes. Attainment of this objective may be furthered by employing flattened nozzle tips which fan the jets out horizontally as indicated in Fig. 2. The temperature in the unheated waxing and polishing chamber, when operating under the conditions stated, with fruit continuously entering and passing through the chamber on the rapidly rotating polisher brushes, is always well below the solidifying point of the paraffin-carnauba mixture; and it is commonly not materially higher than the temperature of the atmosphere outside the chamber, typically 70° to 90° F.

The polisher brushes not only spread out over the surface of the fruit the solid wax powder that contacts the fruit directly in traveling from the atomizer nozzles and adheres to the fruit rind; they also transfer to the fruit and spread thereover a large proportion of the powder that falls upon the brushes, such transfer being due to the preferential adherence of the minute wax particles to the fruit surface under the conditions herein disclosed. Thus, by the time a given fruit has left the chamber, waxy material in the desired amount has been uniformly distributed thereover in a thin coating which is surprisingly effective in retarding the normal rate of shrinkage or withering to which uncoated fruit, especially after it has been washed in the usual cleansing media, is subject. Also the fruit is given an excellent shine or gloss which renders it further attractive to purchasers. In the present instance, this shine is enhanced, after the coated fruit leaves the atomizing or waxing chamber, by the further burnishing given it by the succeeding polisher brushes, which are here shown as simply another section of the one polisher unit illustrated, but which may constitute a separate polisher unit, if desired.

Where, as in the specific illustrative example above given, the nebulized waxy material is jetted toward the fruit and polisher brushes at an angle to the vertical, it is found advantageous that the jets be directed counter to the direction of fruit travel. It will be understood, of course, that by constructing the waxing chamber of sufficient height, it is feasible to locate the atomizing nozzles at such sufficient height above the polisher brushes that the jets of nebulized waxy material may be directed vertically down upon the brushes and the steam of fruit passing thereover. However, this may often increase equipment costs undesirably, not to mention the increased space requirement which may be a serious inconvenience in many cases.

It will be understood that a large and perhaps the greater part of the minute waxy particles atomized into the chamber atmosphere will travel more than the necessary minimum distance before contacting either fruit or polisher brushes, due to the retarding and dispersing effect of said atmosphere upon the jets, which is increasingly pronounced as the distance from the nozzle outlets increases. This results in much of the nebulized material floating about in circuitous paths longer than the prescribed minimum before contacting either the fruit or the brushes. A considerable part of the powder that reaches the rotating brushes and is not transferred directly by them to the fruit, is thrown off the bristles by centrifugal force and back into the atmosphere; while some finds its way into the pan 41 below the brushes, from which it may be removed from time to time and charged into the melting tank 32 for re-use.

It is clear that any of the various waxes or wax-like materials and blends thereof known to be suitable for use in coating fresh fruit in preparation for market, such for example as those referred to in the prior patents hereinabove mentioned, may be employed in practicing the invention. In addition, it may be noted that ouricury wax may be usefully employed as the hard and high-melting component of waxy blends, generally similar to the paraffin-carnauba blends herein described, its melting point being substantially the same as that of carnauba although its solidifying point is lower. So also, certain high-melting synthetic waxes, gums and resins which are available are susceptible of use in the manner described. For the purposes of this invention, a high-melting waxy material is to be regarded as one having a melting point of not less than about 160° F. The term "waxy material" as herein employed is to be understood, unless otherwise indicated, as generic to coating materials, whether waxes in the technical sense or not, which are non-injurious to fruit and can be effectively used in practicing the new process. The terms "atomizing" and "nebulizing" are used synonymously herein to designate a subdivision of the liquid molten waxy material into extremely fine particles as opposed to relatively coarse droplets.

What is claimed is:

1. In the preparation of fresh fruit for market, the process of providing it with a thin waxy coating to enhance its marketability, which comprises nebulizing liquid molten waxy material into an atmosphere having a temperature sufficiently below the solidifying point thereof to chill and congeal the nebulized material into solid particles and form an aeriform suspension thereof, contacting said aeriform suspension with fresh fruit that has not been previously coated, while ensuring that no uncongealed waxy material shall contact the same, and subjecting said fruit to the action of mechanical rubbing means, at a temperature below said solidifying point, to spread adhering solid waxy material over the fruit in a thin coating.

2. In the preparation of fresh fruit for market, the process of providing it with a thin waxy coating to enhance its marketability, which comprises nebulizing liquid molten waxy material into an atmosphere having a temperature substantially below the solidifying point thereof, passing into contact with resultant congealed solid particles of said material a stream of fresh fruit that has not been previously coated, while ensuring that no uncongealed waxy material shall contact the same, and subjecting said fruit to the action of mechanical rubbing means, at a temperature below said solidifying point, to spread adhering solid waxy material over the fruit in a thin coating.

3. In the preparation of fresh fruit for market, the process of providing it with a thin waxy coating to enhance its marketability, which comprises nebulizing liquid molten waxy material into an atmosphere having a temperature at least 40 degrees F. below the solidifying point thereof, passing into contact with resultant congealed solid particles of said material a stream of fresh fruit that has not been previously coated, and simultaneously subjecting said fruit to the action of mechanical rubbing means, at substantially the temperature of said atmosphere, to spread adhering waxy material thereover in a thin coating, while ensuring that no uncongealed waxy material shall contact either said fruit or said mechanical rubbing means.

4. In the preparation of fresh fruit for market, the process of providing it with a thin coating of waxy material to enhance its marketability, which comprises nebulizing liquid molten waxy material of relatively high melting point into a chamber in which the atmosphere is at a temperature at least 40 degrees F. below the solidifying point of said waxy material, advancing fruit not previously coated through said chamber while subjecting it to the action of mechanical rubbing means, in such relation to the location at which the waxy material is nebulized into the chamber that nebulized material passes into contact with said fruit and said rubbing means, but only after being compelled to travel through said atmosphere a sufficiently long distance to become congealed to solid form.

5. In the preparation of fresh fruit for market, the process set forth in claim 4, wherein said waxy material has a melting point of not less than about 160° F. and the temperature of the atmosphere in said chamber does not exceed about 115° F.

6. In the preparation of fresh fruit for market, the process of providing it with a thin waxy coating to enhance its marketability, which comprises nebulizing a liquid molten mixture or blend of a relatively soft low-melting waxy material with a relatively small proportion of a harder and higher-melting waxy material, said blend having a melting point of at least 160° F., into a chamber in which the atmosphere is at a temperature at least 40 to 50 degrees Fahrenheit below the solidifying point of said blend, advancing fruit not previously coated through said chamber while subjecting it to the action of mechanical rubbing means, in such relation to the location at which the waxy material is nebulized into the chamber that nebulized material passes into contact with said fruit and said rubbing means, but only after being compelled to travel through said atmosphere a sufficiently long distance to become congealed to solid form.

7. In the preparation of fresh fruit for market, the process set forth in claim 6, wherein said blend or mixture comprises paraffin and a smaller proportion of a higher-melting wax selected from the group consisting of carnauba and ouricury waxes.

8. In the preparation of fresh fruit for market, the process of providing it with a thin waxy coating to enhance its marketability, which comprises nebulizing a liquid molten mixture or blend of paraffin wax with a relatively small proportion of carnauba wax, the melting point of said blend being not lower than about 170° F., into a chamber in which the temperature of the atmosphere does not exceed about 115° F., advancing fruit not previously coated through said chamber while subjecting it to the action of mechanical rubbing means, in such relation to the location at which the waxy material is nebulized into the chamber that nebulized material passes into contact with said fruit and said rubbing means, but only after being compelled to travel through said atmosphere a sufficiently long distance to become congealed to solid form.

9. In the preparation of fresh fruit for market, the process of providing it with a thin waxy coating to enhance its marketability, which comprises nebulizing a liquid molten mixture or blend of about 92.5 parts of paraffin wax with 7.5 parts of carnauba wax into a chamber in which the atmosphere is at a temperature of between about 70° and about 100° F., advancing fruit not previously coated through said chamber while subjecting it to the action of mechanical rubbing means, in such relation to the location at which the waxy material is nebulized into the chamber that nebulized material passes into contact with said fruit and said rubbing means, but only after being compelled to travel through said atmosphere a sufficiently long distance to become congealed to solid form.

10. In the preparation of fresh fruit for market, the process of providing it with a thin waxy coating to enhance its marketability, which comprises nebulizing a liquid molten mixture or blend of about 92.5 parts of paraffin wax with 7.5 parts of carnauba wax into a chamber which contains a series of transverse polisher rolls adapted to convey fruit through the chamber from an entrance to an exit, the atmosphere in said chamber being at a temperature of between about 70° and about 100° F., said molten blend being nebulized from a nozzle outlet located at least 12 inches vertically above the brush rolls and focused upon a brush roll at least 20 inches distant from said outlet in a direction toward the chamber entrance, and advancing into and through said chamber, on said brush rolls, fresh fruit that has just previously been washed and surface-dried.

11. In the preparation of fresh fruit for market, the process which comprises washing and surface-drying fresh fruit, immediately thereafter contacting said fruit with solidifying particles of waxy material nebulized from liquid molten condition in proximity to said fruit, and subjecting the fruit to the action of mechanical rubbing means to spread adhering waxy particles thereover in a thin coating; the temperature of the atmosphere in which the application of the waxy material and the rubbing of the fruit are effected being below the solidifying point of said waxy material, and the nebulized material being compelled to follow a path through said atmosphere, in passing from the point of nebulization to the fruit and the rubbing means, sufficiently long to prevent uncongealed material from reaching either of them.

12. In the preparation of fresh fruit for market, the process set forth in claim 1, wherein the nebulizing of the molten waxy material is effected with the aid of heated compressed air.

13. In the preparation of fresh fruit for market, the process set forth in claim 4, wherein the nebulizing of the molten waxy material is effected with the aid of heated compressed air at a pressure on the order of from 0.75 pound to 2.75 pounds per square inch, while the temperature within said chamber does not substantially exceed 100° F.

14. In the preparation of fresh fruit for market, the process set forth in claim 6, wherein the nebulizing of the molten waxy material is effected with the aid of heated compressed air at a pressure on the order of from 0.75 pound to 2.75 pounds per square inch.

15. In the preparation of fresh fruit for market, the process set forth in claim 8, wherein the nebulizing of the molten waxy material is effected with the aid of heated compressed air at a pressure on the order of from 0.75 pound to 2.75 pounds per square inch.

LLOYD W. BURWICK.
CHARLES D. COTHRAN.
THOMAS GEORGE CUNNING.

CERTIFICATE OF CORRECTION.

Patent No. 2,364,946. December 12, 1944.

LLOYD W. BURWICK, ET AL.

It is hereby certified that error appears in the printed specification of the above numbered patent requiring correction as follows: Page 7, first column, line 6, claim 11, for the word "solidifying" read --solidified--; and that the said Letters Patent should be read with this correction therein that the same may conform to the record of the case in the Patent Office.

Signed and sealed this 27th day of March, A. D. 1945.

Leslie Frazer (Seal) Acting Commissioner of Patents.

chamber, on said brush rolls, fresh fruit that has just previously been washed and surface-dried.

11. In the preparation of fresh fruit for market, the process which comprises washing and surface-drying fresh fruit, immediately thereafter contacting said fruit with solidifying particles of waxy material nebulized from liquid molten condition in proximity to said fruit, and subjecting the fruit to the action of mechanical rubbing means to spread adhering waxy particles thereover in a thin coating; the temperature of the atmosphere in which the application of the waxy material and the rubbing of the fruit are effected being below the solidifying point of said waxy material, and the nebulized material being compelled to follow a path through said atmosphere, in passing from the point of nebulization to the fruit and the rubbing means, sufficiently long to prevent uncongealed material from reaching either of them.

12. In the preparation of fresh fruit for market, the process set forth in claim 1, wherein the nebulizing of the molten waxy material is effected with the aid of heated compressed air.

13. In the preparation of fresh fruit for market, the process set forth in claim 4, wherein the nebulizing of the molten waxy material is effected with the aid of heated compressed air at a pressure on the order of from 0.75 pound to 2.75 pounds per square inch, while the temperature within said chamber does not substantially exceed 100° F.

14. In the preparation of fresh fruit for market, the process set forth in claim 6, wherein the nebulizing of the molten waxy material is effected with the aid of heated compressed air at a pressure on the order of from 0.75 pound to 2.75 pounds per square inch.

15. In the preparation of fresh fruit for market, the process set forth in claim 8, wherein the nebulizing of the molten waxy material is effected with the aid of heated compressed air at a pressure on the order of from 0.75 pound to 2.75 pounds per square inch.

LLOYD W. BURWICK.
CHARLES D. COTHRAN.
THOMAS GEORGE CUNNING.

CERTIFICATE OF CORRECTION.

Patent No. 2,364,946. December 12, 1944.

LLOYD W. BURWICK, ET AL.

It is hereby certified that error appears in the printed specification of the above numbered patent requiring correction as follows: Page 7, first column, line 6, claim 11, for the word "solidifying" read --solidified--; and that the said Letters Patent should be read with this correction therein that the same may conform to the record of the case in the Patent Office.

Signed and sealed this 27th day of March, A. D. 1945.

Leslie Frazer (Seal) Acting Commissioner of Patents.